US012651462B1

(12) United States Patent
Thompson et al.

(10) Patent No.: US 12,651,462 B1
(45) Date of Patent: Jun. 9, 2026

(54) SYSTEMS AND METHODS FOR POINT CLOUD ANNOTATION USING KINEMATIC MODELS

(71) Applicant: Torc Robotics, Inc., Blacksburg, VA (US)

(72) Inventors: David John Thompson, Christiansburg, VA (US); Robert Charles Kriener, Roanoke, VA (US); Haseeb Chaudhry, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 42 days.

(21) Appl. No.: 18/977,655

(22) Filed: Dec. 11, 2024

(51) Int. Cl.
　　*G06V 20/56*　　　(2022.01)
　　*G01S 17/89*　　　(2020.01)
　　*G06T 5/50*　　　(2006.01)
　　*G06V 20/70*　　　(2022.01)

(52) U.S. Cl.
　　CPC .............. *G06V 20/56* (2022.01); *G01S 17/89* (2013.01); *G06T 5/50* (2013.01); *G06V 20/70* (2022.01); *G06T 2207/20221* (2013.01)

(58) Field of Classification Search
　　CPC ........ G06V 20/56; G06V 20/70; G01S 17/89; G06T 5/50; G06T 2207/20221
　　USPC ........................................................ 348/148
　　See application file for complete search history.

(56) References Cited

U.S. PATENT DOCUMENTS

| | | | |
|---|---|---|---|
| 11,556,744 B1 | 1/2023 | Joshi et al. | |
| 11,954,914 B2 | 4/2024 | Wehr et al. | |
| 11,961,208 B2 | 4/2024 | Li et al. | |
| 12,050,267 B2 * | 7/2024 | Armstrong-Crews | ...................... G01S 17/89 |
| 2022/0153310 A1 | 5/2022 | Yang et al. | |
| 2024/0126268 A1 | 4/2024 | Yang et al. | |
| 2024/0273948 A1 * | 8/2024 | Latapie | ................. G06V 20/41 |
| 2024/0310851 A1 * | 9/2024 | Ebrahimi Afrouzi | ... G01S 17/87 |
| 2025/0076486 A1 * | 3/2025 | Burlina | ................. G01S 13/867 |
| 2025/0291604 A1 * | 9/2025 | Jehu | ....................... G06F 9/4411 |
| 2025/0304100 A1 * | 10/2025 | Davis | ................. B60W 60/001 |

* cited by examiner

*Primary Examiner* — Behrooz M Senfi
(74) *Attorney, Agent, or Firm* — McCarter & English, LLP

(57) ABSTRACT

A system including at least one memory and at least one processor coupled to the at least one memory is disclosed. The at least one processor is configured to: receive, from a sensor on an autonomous vehicle, sensor data; receive, from a camera on the autonomous vehicle, camera data; provide a frame of the camera data overlaid with a respective frame of the sensor data to a user; receive a user annotation indicative of an actor in the frame, where the user annotation encloses a first set of points associated with the actor; generate an a virtual annotation enclosing a second set of points associated with the actor; determine that a point in the second set of points is older than a reference time; project the point to a new position based on a kinematic model; generate a temporally aggregated actor to determine a quality of the user input.

20 Claims, 7 Drawing Sheets

700

700

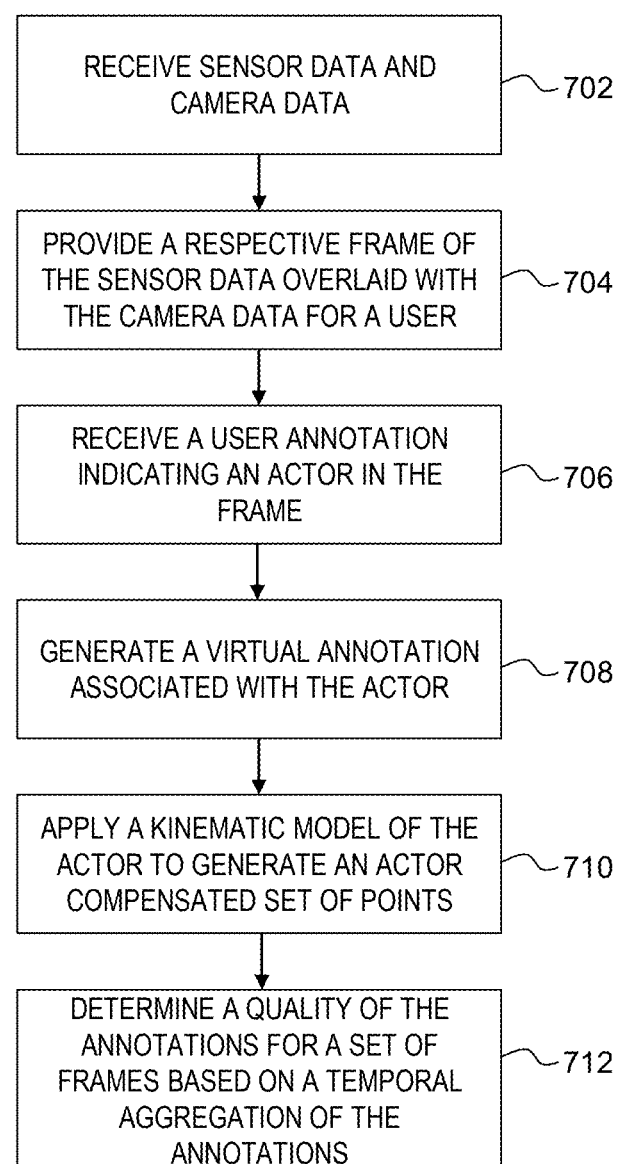

RECEIVE SENSOR DATA AND CAMERA DATA — 702

PROVIDE A RESPECTIVE FRAME OF THE SENSOR DATA OVERLAID WITH THE CAMERA DATA FOR A USER — 704

RECEIVE A USER ANNOTATION INDICATING AN ACTOR IN THE FRAME — 706

GENERATE A VIRTUAL ANNOTATION ASSOCIATED WITH THE ACTOR — 708

APPLY A KINEMATIC MODEL OF THE ACTOR TO GENERATE AN ACTOR COMPENSATED SET OF POINTS — 710

DETERMINE A QUALITY OF THE ANNOTATIONS FOR A SET OF FRAMES BASED ON A TEMPORAL AGGREGATION OF THE ANNOTATIONS — 712

FIG. 7

SYSTEMS AND METHODS FOR POINT CLOUD ANNOTATION USING KINEMATIC MODELS

TECHNICAL FIELD

The field of the disclosure relates generally to generating training data for use in training a machine-learning model and, more specifically, using kinematic models to aggregate point clouds to individual actors to improve annotated point cloud data.

BACKGROUND OF THE INVENTION

Autonomous vehicles employ fundamental technologies such as, perception, localization, behaviors and planning, and control. Perception technologies enable an autonomous vehicle to sense and process its environment. Perception technologies process a sensed environment to identify and classify objects, or groups of objects, in the environment, for example, pedestrians, vehicles, or debris. Localization technologies determine, based on the sensed environment, for example, where in the world, or on a map, the autonomous vehicle is. Localization technologies process features in the sensed environment to correlate, or register, those features to known features on a map. Localization technologies may rely on inertial navigation system (INS) data. Behaviors and planning technologies determine how to move through the sensed environment to reach a planned destination. Behaviors and planning technologies process data representing the sensed environment and localization or mapping data to plan maneuvers and routes to reach the planned destination for execution by a controller or a control module. Controller technologies use control theory to determine how to translate desired behaviors and trajectories into actions undertaken by the vehicle through its dynamic mechanical components. This includes steering, braking and acceleration.

Machine learning algorithms for perception technologies to process the sensed environment to identify and classify objects, or groups of objects, for example, pedestrians, vehicles, sign boards, or debris, etc., are trained using supervised machine learning techniques in which humans annotate various objects in the sensor data, for example, image data from camera sensors, or point cloud data from light detection and ranging sensors. Training machine learning algorithms using the supervised machine learning techniques is a laborious and time-consuming process. Additionally, accuracy of training the machine learning algorithms for perception technologies, for example, for actor prediction, tracking and object size estimation, using supervised machine learning techniques is affected by human bias.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system including at least one memory configured to store machine executable instructions and at least one processor coupled to the at least one memory is disclosed. The at least one processor is configured to execute the instructions to perform operations including: (i) receiving, from a sensor mounted on an autonomous vehicle, sensor data; (ii) receiving, from a camera mounted on the autonomous vehicle, camera data; (iii) providing a respective frame of a set of frames of the camera data overlaid with a corresponding frame of the sensor data, via an interface of a client device, to a user; (iv) receiving, via the interface, a user annotation indicating an actor in the respective frame, where the user annotation is drawn by the user based on the camera data and encloses a first set of points of the sensor data associated with the actor; (v) generating a virtual annotation enclosing a second set of points associated with the actor, where the second set of points includes the first set of points; (vi) determining that a point in the second set of points is associated with a time that is older than a reference time; (vii) generating an actor compensated set of points by projecting the point to a new position based on a kinematic model associated with the actor; (viii) generating a temporally aggregated actor by overlaying the first set of points of the respective frames of the set of frames to determine a quality associated with the user annotations.

In another aspect, a computer-implemented method is disclosed. The computer-implemented method includes: (i) receiving, from a sensor mounted on an autonomous vehicle, sensor data; (ii) receiving, from a camera mounted on the autonomous vehicle, camera data; (iii) providing a respective frame of a set of frames of the camera data overlaid with a corresponding frame of the sensor data, via an interface of a client device, to a user; (iv) receiving, via the interface, a user annotation indicating an actor in the respective frame, where the user annotation is drawn by the user based on the camera data and encloses a first set of points of the sensor data associated with the actor; (v) generating a virtual annotation enclosing a second set of points associated with the actor, where the second set of points includes the first set of points; (vi) determining that a point in the second set of points is associated with a time that is older than a reference time; (vii) generating an actor compensated set of points by projecting the point to a new position based on a kinematic model associated with the actor; (viii) generating a temporally aggregated actor by overlaying the first set of points of the respective frames of the set of frames to determine a quality associated with the user annotations.

In yet another aspect, a system including an autonomous vehicle hosting a sensor and a camera, and a computing system including at least one memory configured to store machine executable instructions and at least one processor coupled to the at least one memory is disclosed. The at least one processor is configured to execute the instructions to perform operations including: (i) receiving, from the autonomous vehicle, sensor data and camera data; (ii) providing a respective frame of a set of frames of the camera data overlaid with a corresponding frame of the sensor data, via an interface of a client device, to a user; (iii) receiving, via the interface, a user annotation indicating an actor in the respective frame, where the user annotation is drawn by the user based on the camera data and encloses a first set of points of the sensor data associated with the actor; (iv) generating a virtual annotation enclosing a second set of points associated with the actor, where the second set of points includes the first set of points; (v) determining that a point in the second set of points is associated with a time that is older than a reference time; (vi) generating an actor compensated set of points by projecting the point to a new position based on a kinematic model associated with the actor; (vii) generating a temporally aggregated actor by overlaying the first set of points of the respective frames of the set of frames to determine a quality associated with the user annotations.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 7 is a flow chart of a method for generating training data based on annotated sensor data.

Figure 1:
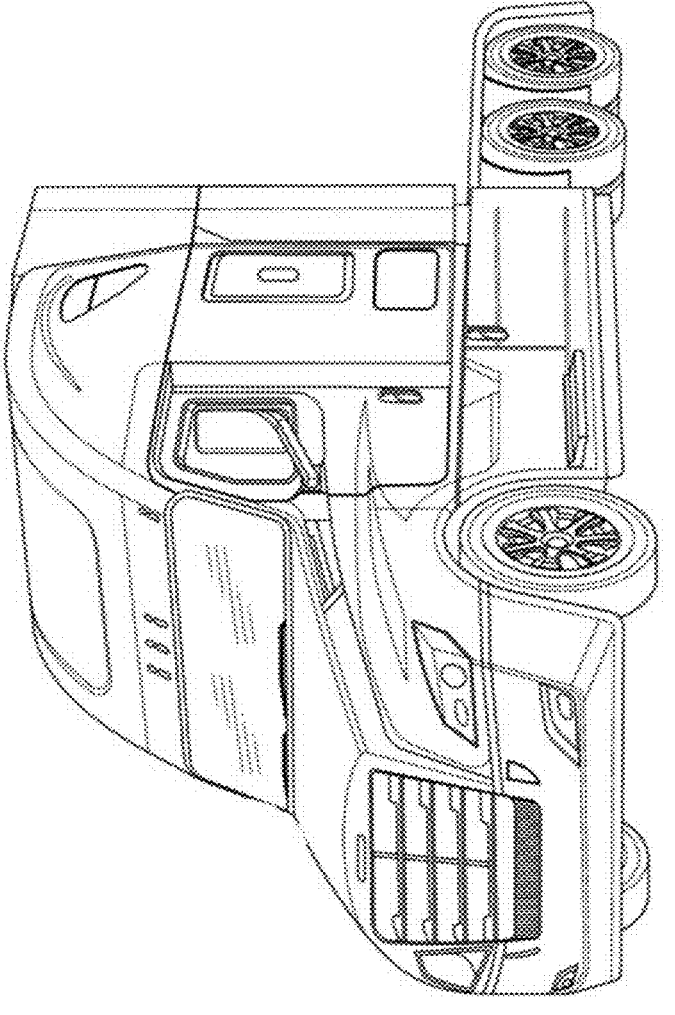
FIG. 1. is a schematic view of an autonomous truck.
Figure 1:
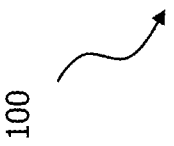

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

Some structural or method features may be shown in specific arrangements and/or orderings in the drawings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

One or more of the following terms may be used in the disclosure, and their definition is provided below.

An autonomous vehicle: An autonomous vehicle is a vehicle that is able to operate itself to perform various operations such as controlling or regulating acceleration, braking, steering wheel positioning, and so on, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane and/or parking the vehicle without human intervention. A semi-autonomous vehicle has an autonomy level of level-1, level-2, or level-3 recognized by NHTSA.

A non-autonomous vehicle: A non-autonomous vehicle is a vehicle that is neither an autonomous vehicle nor a semi-autonomous vehicle. A non-autonomous vehicle has an autonomy level of level-0 recognized by NHTSA.

Ego vehicle: Ego vehicle, as described herein, refers to a vehicle equipped with sensors to perceive the environment surrounding the ego vehicle. The sensors may include one or more of: one or more camera sensors, one or more radio detection and ranging (RADAR) sensors, one or more light detection and ranging (LiDAR) sensors, one or more inertial measurement unit (IMU) sensors, etc. The ego vehicle may be an autonomous vehicle, a semi-autonomous vehicle, or a non-autonomous vehicle.

RTK-GNSS: Real-Time Kinematic (RTK) and Global Navigation Satellite System (GNSS) positioning are techniques for obtaining position information from satellite-based systems. RTK and GNSS, however, differ in terms of accuracy and methodology. RTK provides positional information that is precise in the order of centimeters based upon real-time correction signals received from a network of fixed reference stations with known positions (also referenced herein as rovers). GNSS, on the other hand, provides positional information that is precise in the order of several meters based upon time-of-flight computations of signals received from satellites that are affected by one or more of: satellite clock errors, atmospheric delays, or multipath errors.

Training of machine learning algorithms using a supervised machine learning technique is a laborious and time-consuming process. Additionally, accuracy of training the machine learning algorithms for perception technologies, for example, for actor prediction, tracking and object size estimation, using supervised machine learning techniques is affected by human bias. The training data described herein for machine-learning algorithms for various perception tasks including, but not limited to, actor prediction, object size estimation, object tracking, etc., is obtained using an ego vehicle. The ego vehicle can be equipped with a sensor system, such as a LiDAR system. For example, the LiDAR system can generate rasterized LiDAR data, e.g., LiDAR data stored in a grid format with one or more cells each representing a portion of the field of view (FOV). The ego vehicle can also be equipped with a camera system to capture camera images of the FOV.

In some examples, the training data used for the supervised machine learning is annotated by one or more users. For example, the annotations can identify various objects or actors in the FOV and can represent a ground truth (GT) where the GT is associated with an actor (e.g., another vehicle in the FOV). The GT of an actor can represent the actor's true position, velocity, and acceleration at a given time. To generate the training data, a human user can, via a graphical user interface (GUI), view a frame of sensor data overlaid with the corresponding frame of camera data. If an actor is present in the frame, the user can annotate the frame by drawing (e.g., using a mouse, stylus, touchscreen, or other input device) a closed shape around the actor. The closed shape can be, for example, a cuboid or a two-dimensional rectangle, or any other closed shape or figure.

The closed shape drawn around the actor thus encloses a set of points (e.g., a point cloud) of sensor data that can be associated with the actor. This annotated data can be used for training autonomous and semi-autonomous vehicle systems to recognize actors or other objects in their environment or FOV.

However, human annotations can be prone to error. For example, a user can draw the closed shape such that additional points not associated with the actor are attributed to the point cloud or such that not all points attributed to the actor are captured in the closed shape. Additionally, variations in the annotations for an actor can occur from frame-to-frame of sensor data. Finally, the operation of the sensors (e.g., time between scans) and the motion of an actor can introduce motion blur or other artifacts affecting the accuracy with which a user can annotate the sensor and/or camera images.

Disclosed embodiments address these issues with generating training data using annotated sensor and camera images. For example, disclosed systems and methods generate and leverage a kinematic model associated with an actor to determine annotation quality and refine annotations, thereby improving the quality and accuracy of training data generated based on the annotations.

As discussed above, a user can input an annotation associated with an actor in a frame of sensor and/or camera data. Disclosed systems can automatically generate a virtual shape enclosing the input shape where the virtual shape is based on a time assumption or a kinematic assumption and encloses a second set of points associated with the actor. The virtual shape is configured to enclose all points that should be compensated to the actor (e.g., based on motion blur or other artifacts). In other words, the virtual shape may enclose points that were not captured by the human annotation that should be associated with the actor. Thus, the second set of points includes the first set of points defined by the user annotation and can include one or more additional points that should be compensated to the actor.

For a given annotated sequence of frames of sensor and/or camera data, the annotation associated with a particular actor can be assigned an identifier that is consistent across frames. In some examples, an actor model can be derived for the annotation by using the difference in position of the annotation between one or more sequential frames. For example, if two frames are captured at 100 meters/second (m/s) apart and the annotation for the actor moves one meter between the first and second frames, then the system can derive that the actor is moving at one m/s. Thus, each point in the first set of points defined by the annotation can be adjusted using the difference between the frame's reference time and the timestamp of an individual point. For example, if a point in the second set of points (e.g., in the virtual shape) is 100 milliseconds (ms) older than a reference time, the point can be projected one meter forward to compensate for the motion of the actor.

The point cloud associated with the actor (e.g., the points enclosed by the annotation) can be further refined using one or more registration techniques. For example, assuming that an actor does not change shape throughout a set of sequential frames (e.g., a scene), then the annotations associated with the actor in each frame of the set of sequential frames should align when overlaid with each other. In other words, the annotations should align when overlaid to create a denser representation of that actor. Errors in the annotations (e.g., discrepancies between frames) can also affect the motion compensation described above. Thus, disclosed systems and methods can identify discrete errors in the temporally aggregated actor. For example, an annotation error of one meter in a frame can result in the appearance of two different overlapping vehicles in the overlay of the annotations. The annotations can be refined using a point cloud registration algorithm, such as iterative closest point (ICP), to automatically detect and measure the one-meter error and update the erroneous annotation accordingly. As referenced above, this can affect the motion compensation, and thus, the set of motion-compensated points associated with the actor can be re-derived. Accordingly, this iterative process can be used to mitigate any errors in the annotations, resulting in accurate and robust training data.

FIG. 1 illustrates a vehicle 100, such as a truck that may be conventionally connected to a single or tandem trailer to transport the trailer (not shown) to a desired location. The vehicle 100 includes a cabin that can be supported by, and steered in the required direction, by front wheels and rear wheels that are partially shown in FIG. 1. Front wheels are positioned by a steering system that includes a steering wheel and a steering column (not shown in FIG. 1). The steering wheel and the steering column may be located in the interior of cabin.

The vehicle 100 may be an autonomous vehicle, in which case the vehicle 100 may omit the steering wheel and the steering column to steer the vehicle 100. Rather, the vehicle 100 may be operated by an autonomy computing system (not shown) of the vehicle 100 based on data collected by a sensor network (not shown in FIG. 1) including one or more sensors.

Figure 2:
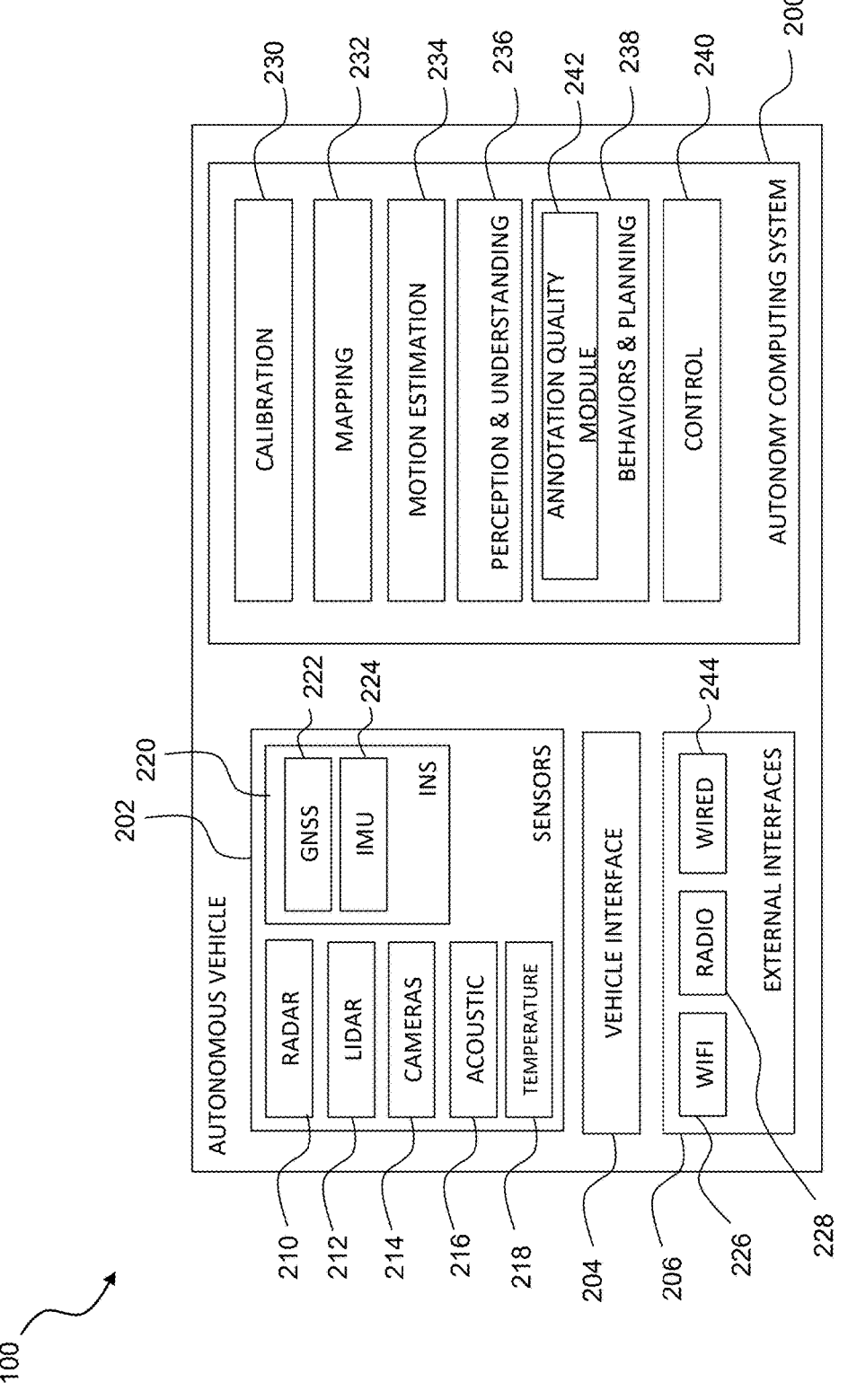
FIG. 2 is a block diagram of the autonomous truck shown in FIG. 1.

FIG. 2 is a block diagram of autonomous vehicle 100 shown in FIG. 1. In the example embodiment, autonomous vehicle 100 includes autonomy computing system 200, sensors 202, a vehicle interface 204, and external interfaces 206.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of autonomous vehicle 100 and its proximity. As described in further detail below, these signals may be used by autonomy computing system 200 to determine how to control operations of autonomous vehicle 100.

Cameras 214 are configured to capture images of the environment surrounding autonomous vehicle 100 in any aspect or field of view (FOV). The FOV can have any angle or aspect such that images of the areas ahead of, to the side, behind, above, or below autonomous vehicle 100 may be captured. In some embodiments, the FOV may be limited to particular areas around autonomous vehicle 100 (e.g., forward of autonomous vehicle 100, to the sides of autonomous vehicle 100, etc.) or may surround 360 degrees of autonomous vehicle 100. In some embodiments, autonomous vehicle 100 includes multiple cameras 214, and the images from each of the multiple cameras 214 may be processed to identify one or more construction markers or other objects in the environment surrounding autonomous vehicle 100. In some embodiments, the image data generated by cameras 214 may be sent to autonomy computing system 200 or other aspects of autonomous vehicle 100 or a hub or both.

LiDAR sensors 212 generally include a laser generator and a detector that send and receive a LiDAR signal such that LiDAR point clouds (or "LiDAR images") of the areas ahead of, to the side, behind, above, or below autonomous vehicle 100 can be captured and represented in the LiDAR point clouds. In some examples, the LiDAR 212 can be a raster LiDAR including a line or grid of sensors for using a pulsed laser to survey the FOV, thereby creating a data map stored as a grid representing the FOV. In other examples, the LiDAR 212 can be a spinning LiDAR with a 360-degree fOV. RADAR sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw RADAR sensor data) from the emitted radio waves. In some embodiments, the system inputs from cameras 214, RADAR sensors 210, or LiDAR sensors 212 may be used in combination to identify one or more construction markers (or nodes) around autonomous vehicle 100.

GNSS receiver 222 is positioned on autonomous vehicle 100 and may be configured to determine a location of autonomous vehicle 100, which it may embody as GNSS data. GNSS receiver 222 may be configured to receive one or more signals from a global navigation satellite system (e.g., Global Positioning System (GPS) constellation) to localize autonomous vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of autonomous vehicle 100. For example, with two GNSS receivers 222, two attitude angles (e.g., roll and yaw) may be measured or determined. In some embodiments, autonomous vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about autonomous vehicle 100 and its environment.

IMU 224 is a micro-electrical-mechanical (MEMS) device that measures and reports one or more features regarding the motion of autonomous vehicle 100, although other implementations are contemplated, such as mechanical, fiber-optic gyro (FOG), or FOG-on-chip (SiFOG) devices. IMU 224 may measure an acceleration, angular rate, or an orientation of autonomous vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of autonomous vehicle 100.

In the example embodiment, autonomy computing system 200 employs vehicle interface 204 to send commands to the various aspects of autonomous vehicle 100 that actually control the motion of autonomous vehicle 100 (e.g., engine, throttle, steering wheel, brakes, etc.) and to receive input data from one or more sensors 202 (e.g., internal sensors). External interfaces 206 are configured to enable autonomous vehicle 100 to communicate with an external network via, for example, a wired or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of autonomous vehicle 100 or when downloading mission data after completion of a trip. The connection(s) may be used to download and install various lines of code in the form of digital files (e.g., HD maps), executable programs (e.g., navigation programs), and other computer-readable code that may be used by autonomous vehicle 100 to navigate or otherwise operate, either autonomously or semi-autonomously. The digital files, executable programs, and other computer readable code may be stored locally or remotely and may be routinely updated (e.g., automatically, or manually) via external interfaces 206 or updated on demand. In some embodiments, autonomous vehicle 100 may deploy with all of the data it needs to complete a mission (e.g., perception, localization, and mission planning) and may not utilize a wireless connection or other connections while underway.

In the example embodiment, autonomy computing system 200 is implemented by one or more processors and memory devices of autonomous vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, a control module or controller 240, and an annotation quality module 242. The annotation quality module 242, for example, may be embodied within another module, such as behaviors and planning module 238, or separately. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard autonomous vehicle 100.

In some examples, the annotation quality module 242 can be hosted on a server or remote computing system. As an example, the server or remote computing system can be configured to receive data transmitted from the autonomous vehicle 100. This data can include data generated by the LiDAR 212 and the camera 214 of the autonomous vehicle. Thus, the annotation quality module 242 can be executed by a processing device of the server on data received from the autonomous vehicle 100.

The annotation quality module 242 may receive human-annotated sensor and/or camera images and can analyze the annotated images to determine annotation quality and/or to refine annotations to improve quality. Improved annotation quality can, for example, improve machine learning outcomes resulting in a more accurate machine learning model. The annotated images can be accessed at the annotation quality module 242. The annotated images can be a set or sequence of frames of sensor and/or camera data. For each frame, the annotation quality module 242 can generate a virtual annotation encompassing a larger number of points (e.g., points of sensor data) than the annotation. A kinematic assumption can be applied to compensate for motion artifacts in the data.

The annotation quality module 242 can further derive a kinematic model for an actor associated with an annotation. For example, the annotation quality module 242 can analyze a sequence of sensor and/or camera images to determine one or more metrics (e.g., a position, speed, trajectory, velocity, acceleration, etc.) associated with the actor based on a difference in position of the actor between sequential frames. The kinematic model can be further used to refine the annotations associated with the actor. In some examples, the annotation quality module 242 can further determine annotation quality or refine annotations using one or more registration techniques to iteratively resolve annotation errors.

Figure 3:
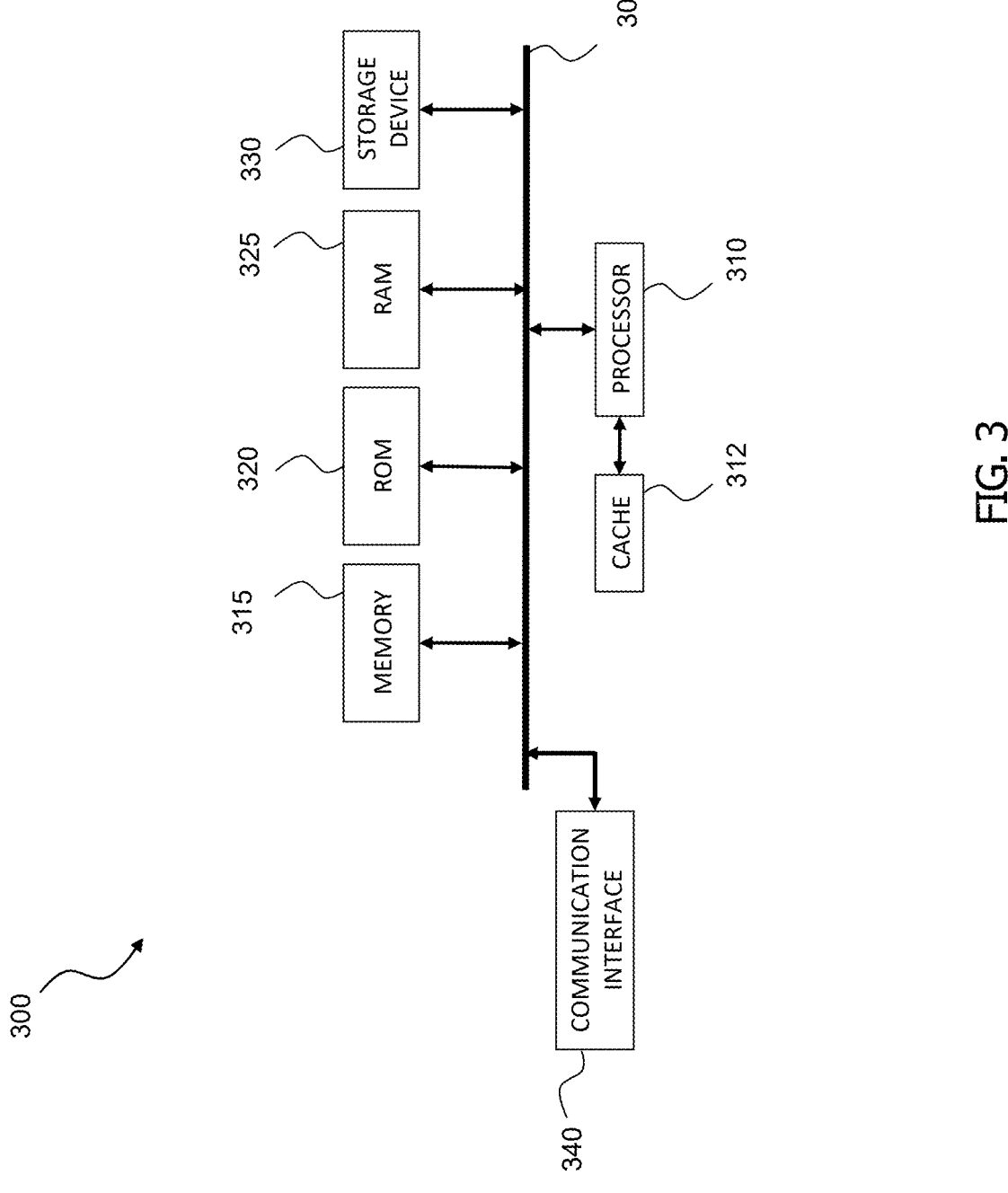
FIG. 3 is a block diagram of an example computing system.

FIG. 3 illustrates an example computing system 300 that can implement various techniques, processes, functions, or methods described herein. The components of computing system 300 are shown in electrical communication with each other using a connection 305, such as a bus. The example computing system 300 includes a processing unit (CPU or processor) 310 and a computing device connection 305 that couples various computing device components, including computing device memory 315, such as a read only memory (ROM) 320 and a random access memory (RAM) 325, and communication interface 340 to processor 310.

Computing system 300 can include a cache 312 of high-speed memory connected directly with, in close proximity to, or integrated as part of processor 310. Computing system 300 can copy data from memory 315 and/or storage device 330 to cache 312 for quick access by processor 310. In this way, cache 312 can provide a performance boost that avoids processor 310 delays while waiting for data. These and other modules can control or be configured to control processor 310 to perform various actions. Other computing device memory 315 may be available for use as well. Memory 315 can include multiple different types of memory with different performance characteristics. Processor 310 can include any general purpose processor, central processing unit (CPU), or graphics processing unit (GPU) in combination with a hardware or software provision configured to control processor 310 and stored in storage device 330, as well as any special-purpose processor where software instructions are incorporated into the processor design. Processor 310 may be a self-contained system, containing multiple cores or processors, a bus, memory controller, cache, etc. A multi-core processor may be symmetric or asymmetric.

Storage device 330 is a non-volatile memory and can be one or more of a hard disk or other types of computer readable media that can store data that are accessible by a computer, such as a magnetic cassette, flash memory card, solid state memory device, digital versatile disk, cartridge, RAM 325, ROM 320, or hybrids thereof. Memory 315 or storage device 330 can include software, code, firmware, etc., for controlling processor 310. Other hardware or software modules are contemplated. Memory 315 and storage device 330 are connected to computing device connection 305. In one aspect, a hardware module that performs a particular function can include the software component stored in a computer-readable medium in connection with the necessary hardware components, such as processor 310, computing device connection 305, and so forth, to carry out the function. In the example embodiment, processor 310 may be programmed by encoding an operation or function using one or more executable instructions and providing the executable instructions in memory 315 or storage device 330.

In some examples, the computing system 300 can be used to access the annotation quality module 242 (e.g., if the annotation quality module 242 is stored on and executed by a remote server, separate from the autonomous vehicle 100). In some examples, a communication interface 340 of the computing system 300 can be used to interact with the annotation quality module 242 via one or more application programming interfaces (APIs). In another example, the annotation quality module 242 can be stored in the memory 315 of the computing device 300 and can be executed by the processor 310. For example, the computing device 300 can access sensor and camera data from the autonomous vehicle 100 (e.g., directly from the autonomous vehicle 100, on a remote database, or stored in a server) such that the annotation quality module 242 can use the accessed sensor and camera data to perform the operations described above with reference to FIG. 2.

Figure 4:
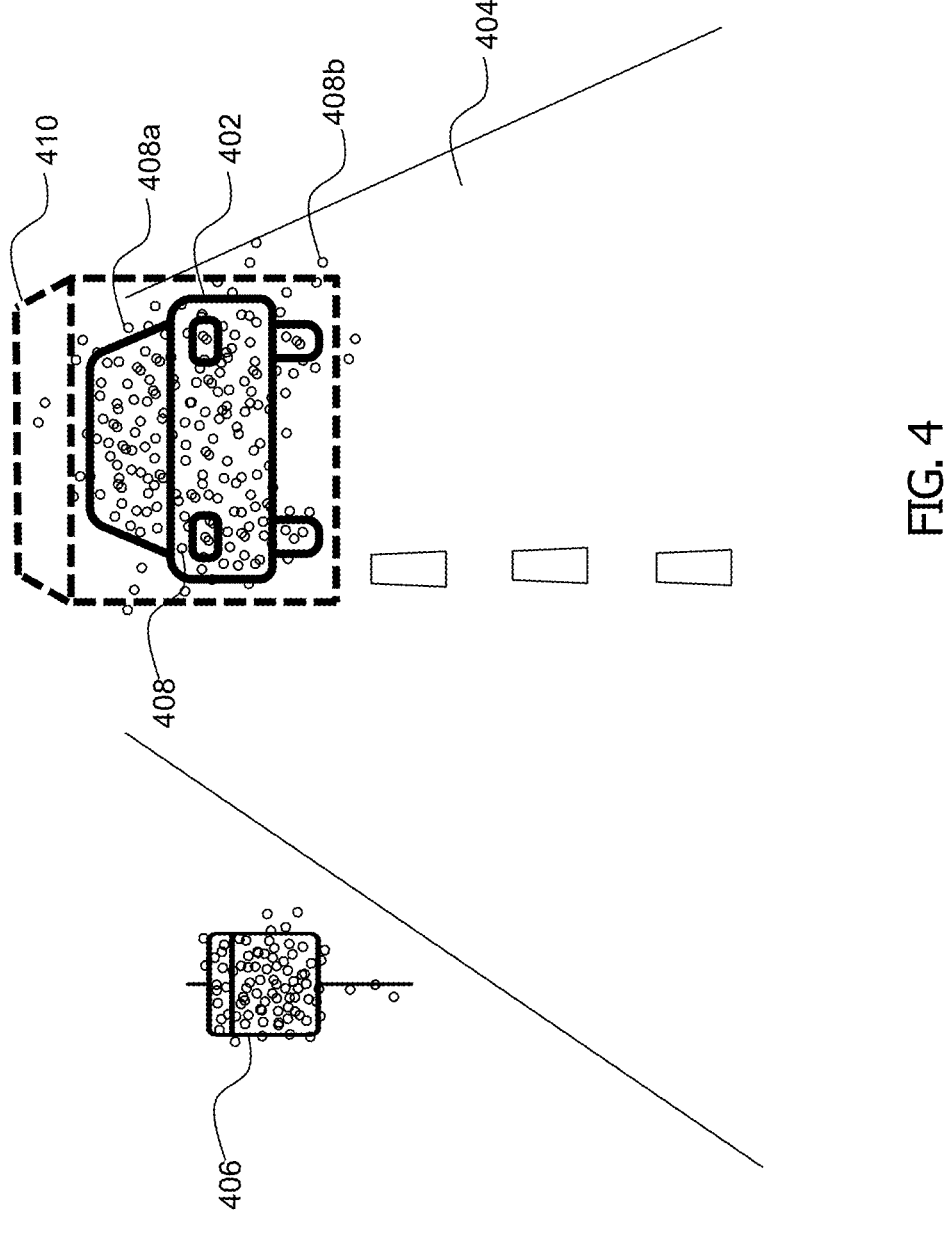
FIG. 4 is an illustration of a frame of camera and sensor data collected by an ego vehicle.

FIG. 4 is an illustration of a frame 400 of camera and sensor data collected by an ego vehicle. For example, one or more cameras and/or sensors of the sensors 202 can capture data associated with the FOV of the autonomous vehicle 100. The frame 400 can be displayed to a user via an interface (e.g., a GUI) where the interface is an interface of a computing device, such as computing system 300 shown in FIG. 3, and is configured to receive input from the user.

The frame 400 can be displayed via an interface or other display of a user device, which can be any computing device (e.g., a laptop, desktop computer, tablet, smartphone, and the like). The GUI displaying frame 400 can be configured to receive input from a user. The input can be received via an input component of the user device, such as a touchscreen, keyboard, mouse, stylus, and the like. The GUI displaying the frame 400 can enable a user to view and interact with data collected by one or more sensors and/or cameras of the autonomous vehicle 100. For example, the user can use the GUI to view individual frames, or sets of frames, and to annotate one or more actors in each frame that are visible in the camera data or sensor data.

The frame 400 can include sensor data (e.g., points 408). The sensor data can be, for example, a point cloud, or a collection of points plotted in three-dimensional space, based on data collected from a sensor of the sensors 202 (e.g., the LiDAR sensor 212). In some examples, the sensor data can be overlaid or superimposed on a corresponding camera image. For example, the camera image can be used to assist the user in annotating the sensor data. As a simplified example, frame 400 can include a camera image of an actor 402, a road 404, and a sign 406 in the FOV of an ego vehicle (e.g., the autonomous vehicle 100). The sensor data of frame 400 can include point clouds associated with the objects in the ego vehicle's FOV (e.g., the actor 402 and the sign 406). Each point (e.g., point 408) of sensor data can represent a distance from the sensor 202 to an object in the FOV of the autonomous vehicle 100.

To generate a training data set for training a machine learning model of the autonomous vehicle 100, a user can annotate the sensor and/or camera data to identify actors in each frame of a set of sequential frames. For example, in frame 400, a user can draw or otherwise input an annotation 410 that is associated with the actor 402. The annotation 410 includes a set of points (e.g., including point 408*a*) within the bounds of the annotation where the set of points are associated with the actor 402. However, human annotations can be prone to error. For example, the annotation 410 may exclude certain points (e.g., point 408*b*) that should be associated with the actor 402. The annotation 410 can define any enclosed volume. In some examples, the annotation can be two-dimensional, such that the annotation defines a closed area. As will be discussed below, systems and methods described herein measure and mitigate the human error such that the annotated data can serve as a high-quality training data set, thereby improving machine learning outcomes.

Figure 5:
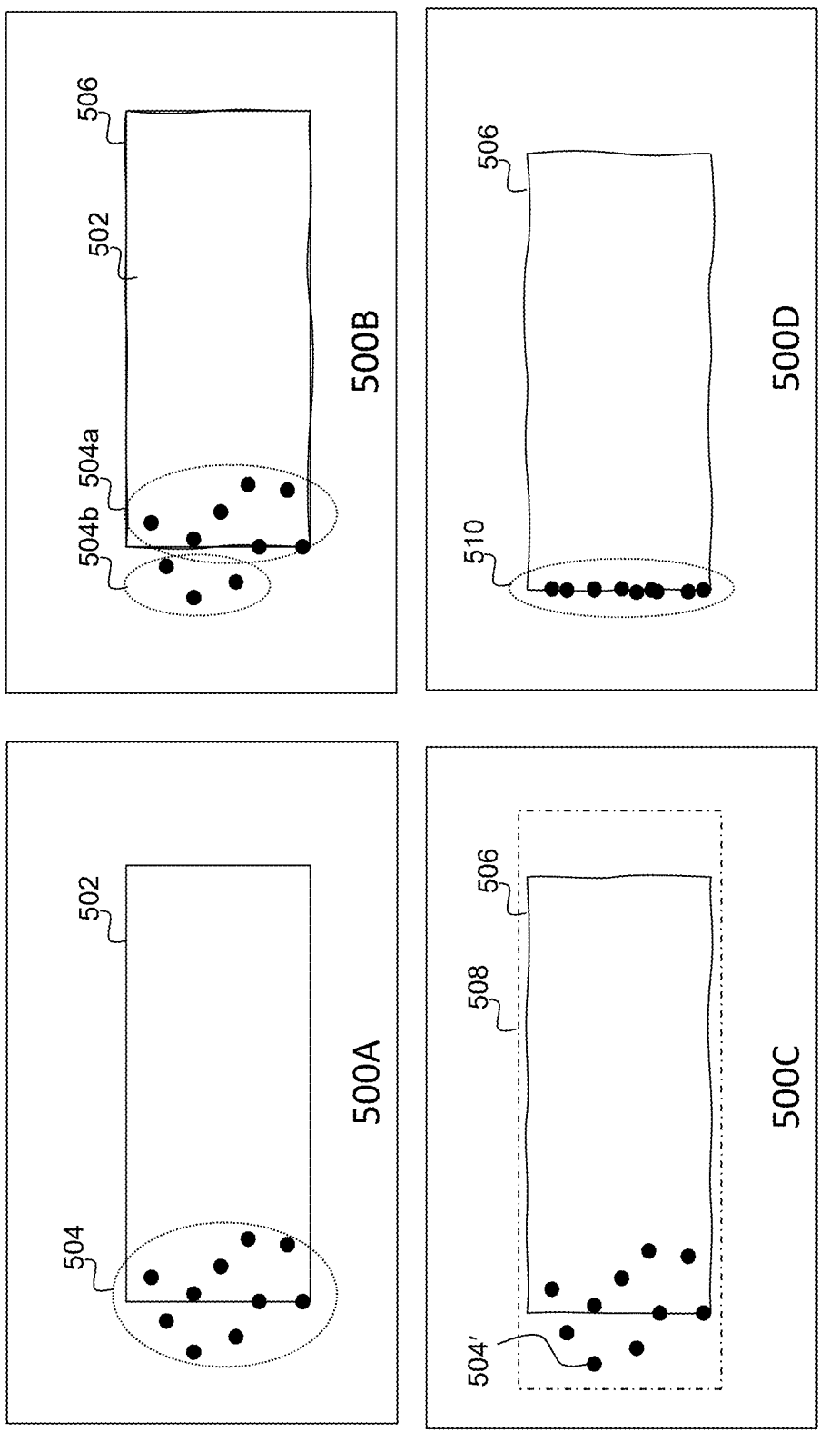
FIG. 5 is an illustration of a process for compensating points to an actor based on an actor annotation.

FIG. 5 is an illustration of a process for compensating points to an actor based on an actor annotation. For simplicity, the illustrations of FIG. 5 are shown in two dimensions, however the process can similarly be used on three-dimensional representations of data.

In pane 500A, an actor 502 (e.g., a vehicle or other moving object in a frame) can be associated with a point cloud including a set of points 504. The frame of pane 500A can be associated with a reference time, t0.

Pane 500B illustrates a human annotation 506 associated with the actor 502. The human annotation can enclose a first set of points 504*a*, which are associated with the actor 502 based on their inclusion in the annotation 506. However, certain points (e.g., points 504*b*) may be points that can be attributed to the actor 502, but are not captured by the human annotation 506. For example, the points 504*b* may be captured at a certain time, t1, that is different from the reference time t of the frame. This can be due to the time it takes the LiDAR 212 to complete a full sweep of the FOV of the autonomous vehicle 100. Accordingly, certain points may be captured prior to others in the same sweep due to actor movement or other artifacts.

To ensure all points attributed to the actor 502 are accounted for, at pane 500C, disclosed systems (e.g., the system 200 or annotation quality module 242) can generate a virtual annotation 508, where the virtual annotation 508 includes the human annotation 506. In some examples, the size and/or shape of the virtual annotation 508 can be based on a kinematic or time assumption. A kinematic or time assumption can be based on, for example, the time to complete a single LiDAR sweep. The virtual annotation 508 can thus be used to determine points that should be compensated to the actor 502.

In some examples, a kinematic model can be derived for the actor 502 based on a difference in the position of the actor 502 between frames. The kinematic model can include, for example, a velocity, speed, trajectory, and/or acceleration associated with the actor 502. This kinematic model can be used to generate an actor compensated annotation associated with a set of compensated points of the point cloud of the actor 502. As an example, point 504' may be associated with time t1, which is 100 ms prior to the reference time to. Based on the kinematic model of the actor 502, the point 504' can be projected forward to compensate for the motion of the actor 502 between t1 and t0.

Pane 500D illustrates the annotation 506 of the actor 502 when all points within the virtual annotation 508 have been motion-compensated (e.g., yielding the set of points 510). Thus, the process described with reference to FIG. 5 can be used to account for actor motion, sensor motion, or other artifacts to improve the quality of the human annotation 506. Thus, the human annotation 506 encompasses a point cloud that is a more accurate representation of the actor 502.

Figure 6:
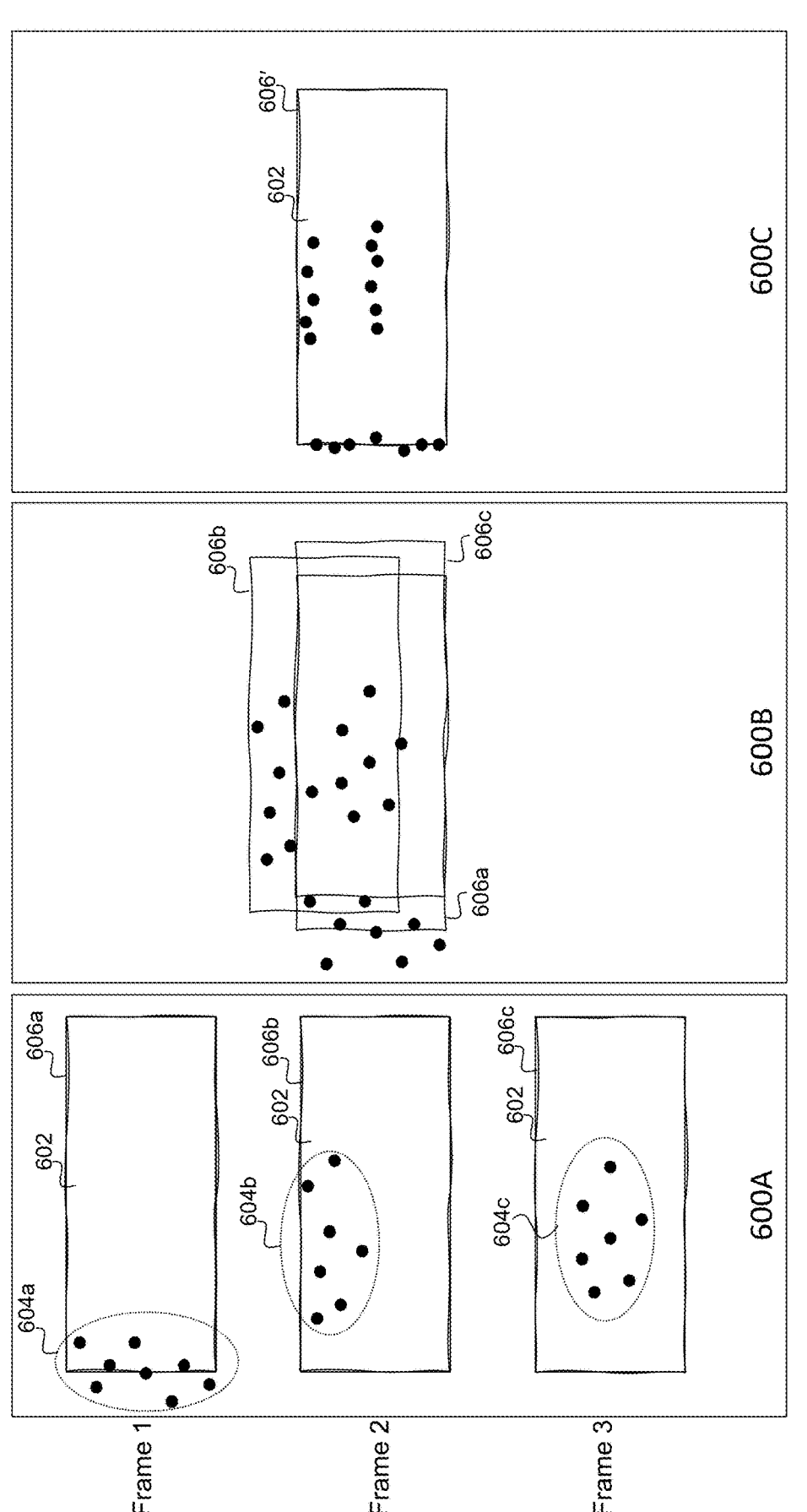
FIG. 6 is an illustration of a process for refining point cloud annotations.

FIG. 6 is an illustration of an additional process for determining annotation quality and for refining an annotation. FIG. 6 illustrates a series of annotations (e.g., annotations 606*a*, 606*b*, and 606*c*) of a sequential series of frames, frames 1-3. Each frame can be associated with a different reference time, such that the set of points associated with the actor 602 in each frame represent the position of the actor 602 in each frame.

In pane 600A, annotations 606*a*, 606*b*, and 606*c* are associated with sets of points 604*a*, 604*b*, and 604*c* respectively. The annotation in each frame can be drawn or otherwise input by the user based on sensor and/or camera data associated with the FOV of the autonomous vehicle 100.

To evaluate the quality of the human annotations, the annotations 606*a*, 606*b*, and 606*c*, can be overlaid on each other as illustrated in pane 600B. For example, the annotation quality module 242 can superimpose the annotations and associated sets of points onto a particular reference frame. In this example, the annotations of frames 1 and 3 have been aggregated, or overlaid, on the annotation of frame 2 to yield a temporal aggregation of the annotations. As shown in pane 600B, the annotations 606*a*, 606*b*, and 606*c* may not perfectly align due to errors in the annotations or other artifacts, such as motion blur.

In some examples, the annotation quality module 242 can determine a quality of the annotations of the series of frames based on an amount of error in the overlaid annotations. The amount of error could be, for example, a distance of an edge of the annotation 606*a* from a corresponding edge of the base annotation 606*b*. Other measures of error are also possible. The quality, or amount of error, can be provided as feedback to the human annotator or can be used as a measure of whether the annotations can be included in a training data set. For example, if the quality is greater than a given threshold (or the error is below an error threshold) the annotations for frames 1 through 3 can be included in a training data set. The error threshold can be, for example, a threshold set by a user defining a maximum amount of error in the human annotations, above which the human annotations cannot be used as training data. Similarly, a quality threshold can be a threshold set by a user defining a minimum quality of the human annotations, below which the human annotations cannot be used as training data.

In some examples, if the quality is less than the given threshold (or the error is above an error threshold), the annotation quality module 242 can apply one or more point cloud registration techniques to refine the annotations. For example, the annotation quality module 242 can employ an iterative closest point (ICP) algorithm to refine the annotations to yield the annotation 606' shown in pane 600C. Generally, the point cloud registration techniques can enable the annotation quality module 242 to automatically detect and measure the error between an annotation and a subsequent annotation and update the annotation accordingly. Further, a change to the annotation can trigger an update to the kinematic model associated with the actor because, if the position of one or more points is updated, this may result in a change in the kinematic model derived based on the original position of the one or more points. Accordingly, the kinematic model can be re-derived for the actor based on the point positions that were updated using the point cloud registration techniques. Thus, in some examples, once an annotation is updated based on the new point positions, the annotation quality module 242 can re-derive the kinematic model using the new positions. The updated kinematic model can be used to update the actor compensated annotation described with reference to FIG. 5 by applying the updated kinematic model to the set of point associated with the actor. The annotation quality module 242 can iteratively execute this process to improve and optimize the annotation for a given actor across a set of frames. For example, the annotation quality module 242 can iteratively update and refine the actor compensated annotations until the accuracy of the annotations is sufficient for use as training data (e.g., the error in the actor compensated annotations is below an error threshold, or the quality of the actor compensated annotations is above a quality threshold).

FIG. 7 is a flow chart of a method 700 for generating training data based on annotated sensor data. The method 700 may be performed by autonomy computing system 200 shown in FIG. 2 or a computing device 300 shown in FIG. 3, which may be a server (or an application server) located at mission control. The method 700 may be performed by the annotation quality module 242 based upon sensor data of sensors 202.

The method 700 can include receiving 702, by the annotation quality module 242, sensor data from a sensor (e.g., LiDAR 212 or another sensor 202) mounted on an autonomous vehicle 100 and camera data from a camera (e.g., a camera 214) mounted on the autonomous vehicle 100. The camera data can include a set of sequential frames and the sensor data can include a corresponding set of sequential frames.

The method 700 can include providing 704 a respective frame from the set of frames of the camera data overlaid with a corresponding frame of the sensor data. For example, the sensor data and camera data can be provided via a user device having an interface for displaying information. In some examples, only the sensor data or only the camera data is displayed to the user for annotation. In some examples the displayed camera data and/or sensor data is manipulatable (e.g., via input to the interface) such that the user can view the data from multiple angles, zoom in on or out from data, or otherwise explore the displayed data.

The method 700 can include receiving 706 a user annotation indicating an actor in the respective frame. The user annotation can be input as a two-dimensional annotation (e.g., a rectangle) defining an area of points in the respective frame, or can be a three-dimensional object (e.g., a cuboid) defining a volume of points in the respective frame. For example, the annotation can be drawn around the camera image of the actor in the frame and can enclose a first set of points of the sensor data.

The method 700 can include generating 708 a virtual annotation enclosing a second set of points associated with the actor in the respective frame. As discussed above, the virtual annotation can be based on a kinematic assumption and the second set of points can encompass the first set of points as well as additional points that should be compensated to the actor. The virtual annotation can be generated by the annotation quality module 242.

The method 700 can include applying 710 a kinematic model of the actor to generate an actor compensated set of points. For example, the annotation quality module 242 can determine that a point in the second set of points was recorded at a time prior to a reference time associated with the respective frame. Based on this determination, the annotation quality module 242 can compensate for motion of the actor between the time the point was recorded and the reference time of the frame using a kinematic model of the actor to determine a vector for projecting the point. The kinematic model of the actor can be based on a difference in position of the actor between two subsequent frames. The annotation quality module 242 can generate an actor compensated set of points including the first set of points and any projected points from the second set of points enclosed by the virtual annotation.

The method 700 can include determining 712 a quality of the annotations for the set of frames based on a temporal aggregation of the annotations. For example, the annotation quality module 242 can generate a temporally aggregated actor by overlaying the actor compensated sets of points of the respective frames of the set of frames to determine a quality associated with user annotations. As discussed with reference to FIG. 6, the quality can be compared to a quality threshold for determining whether to include the annotations and their associated data in a training data set. In some examples, the annotation quality module 242 can further apply one or more registration techniques to iteratively optimize the user annotations to account for any error in annotations. The optimized annotations can then be included in a training data set, e.g., once the quality of the annotations meets or exceeds the quality threshold.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least improving safety of an autonomous vehicle by providing accurate training data to train machine learning models for controlling the autonomous vehicle. The improved quality of the training data can result in improved machine learning model outcomes by increasing the prediction accuracy of the machine learning model.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a program, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, including the implementation or utilization of components of the systems or steps independently and separately from other described components or steps. Therefore, it is manifestly intended that embodiments described herein be limited only by the claims.

What is claimed is:

1. A system comprising:
at least one memory configured to store machine executable instructions; and
at least one processor coupled to the at least one memory and configured to execute the machine executable instructions to perform operations comprising:
receiving, from a sensor mounted on an autonomous vehicle, sensor data;
receiving, from a camera mounted on the autonomous vehicle, camera data;
providing a respective frame of a set of frames of the camera data overlaid with a corresponding frame of the sensor data, via an interface of a client device, to a user;
receiving, via the interface, a user annotation indicating an actor in the respective frame, wherein the user annotation is drawn by the user based on the camera data and encloses a first set of points of the sensor data associated with the actor;
generating a virtual annotation enclosing a second set of points associated with the actor, wherein the second set of points comprises the first set of points;
determining that a point in the second set of points is associated with a time that is older than a reference time;
generating an actor compensated set of points by projecting the point to a new position based on a kinematic model associated with the actor;
generating a temporally aggregated actor by overlaying the actor compensated sets of points of the respective frames of the set of frames to determine a quality associated with user annotations.

2. The system of claim 1, wherein the operations further comprise:
generating the kinematic model for the actor by comparing a position of a first point of the first set of points in the respective frame with the position of the first point in a subsequent frame.

3. The system of claim 1, wherein the kinematic model comprises a velocity and an acceleration associated with the actor.

4. The system of claim 1, wherein the user input is annotated with an identifier that is associated with the actor across frames of the set of frames.

5. The system of claim 1, wherein the operations further comprise:

based on the quality being less than a threshold quality, refining the first set of points by:

determining an annotation error of a point of the first set of points; and compensating the point based on a difference in position of the point in a reference frame and a subsequent frame.

6. The system of claim 5, wherein the operations further comprise:

updating, based on the compensation, the kinematic model; and re-generating the temporally aggregated actor using the updated kinematic model.

7. The system of claim 6, wherein the operations further comprise:

iteratively optimizing the temporally aggregated actor until the quality is greater than or equal to the threshold quality.

8. The system of claim 1, wherein the first sensor data is generated by a raster LiDAR mounted on the autonomous vehicle.

9. The system of claim 1, wherein the user annotation is a three-dimensional cuboid.

10. A computer-implemented method comprising:

receiving, from a sensor mounted on an autonomous vehicle, sensor data;

receiving, from a camera mounted on the autonomous vehicle, camera data;

providing a respective frame of a set of frames of the camera data overlaid with a corresponding frame of the sensor data, via an interface of a client device, to a user;

receiving, via the interface, a user annotation indicating an actor in the respective frame, wherein the user annotation is drawn by the user based on the camera data and encloses a first set of points of the sensor data associated with the actor;

generating a virtual annotation enclosing a second set of points associated with the actor, wherein the second set of points comprises the first set of points;

determining that a point in the second set of points is associated with a time that is older than a reference time;

generating an actor compensated set of points by projecting the point to a new position based on a kinematic model associated with the actor;

generating a temporally aggregated actor by overlaying the actor compensated sets of points of the respective frames of the set of frames to determine a quality associated with user annotations.

11. The method of claim 10, further comprising:

generating the kinematic model for the actor by comparing a position of a first point of the first set of points in the respective frame with the position of the first point in a subsequent frame.

12. The method of claim 10, wherein the kinematic model comprises a velocity and an acceleration associated with the actor.

13. The method of claim 10, wherein the user input is annotated with an identifier that is associated with the actor across frames of the set of frames.

14. The method of claim 10, further comprising:

based on the quality being less than a threshold quality, refining the first set of points by:

determining an annotation error of a point of the first set of points; and compensating the point based on a difference in position of the point in a reference frame and a subsequent frame.

15. The method of claim 14, further comprising:

updating, based on the compensation, the kinematic model; and re-generating the temporally aggregated actor using the updated kinematic model.

16. The method of claim 15, further comprising:

iteratively optimizing the temporally aggregated actor until the quality is greater than or equal to the threshold quality.

17. The method of claim 10, wherein the first sensor data is generated by a raster LiDAR mounted on the autonomous vehicle.

18. The method of claim 10, wherein the user annotation is a three-dimensional cuboid.

19. A system comprising:

an autonomous vehicle hosting a sensor and a camera; and a computing system comprising:

at least one interface;

at least one memory configured to store machine executable instructions; and at least one processor coupled to the at least one memory and configured to execute the instructions to perform operations comprising:

receiving, from the autonomous vehicle, sensor data and camera data;

providing a respective frame of a set of frames of the camera data overlaid with a corresponding frame of the sensor data, via an interface of a client device, to a user;

receiving, via the interface, a user annotation indicating an actor in the respective frame, wherein the user annotation is drawn by the user based on the camera data and encloses a first set of points of the sensor data associated with the actor;

generating a virtual annotation enclosing a second set of points associated with the actor, wherein the second set of points comprises the first set of points;

determining that a point in the second set of points is associated with a time that is older than a reference time;

generating an actor compensated set of points by projecting the point to a new position based on a kinematic model associated with the actor;

generating a temporally aggregated actor by overlaying the actor compensated sets of points of the respective frames of the set of frames to determine a quality associated with user annotations.

20. The system of claim 19, wherein the operations further comprise:

generating the kinematic model for the actor by comparing a position of a first point of the first set of points in the respective frame with the position of the first point in a subsequent frame.

* * * * *